United States Patent Office 2,912,641
Patented Nov. 10, 1959

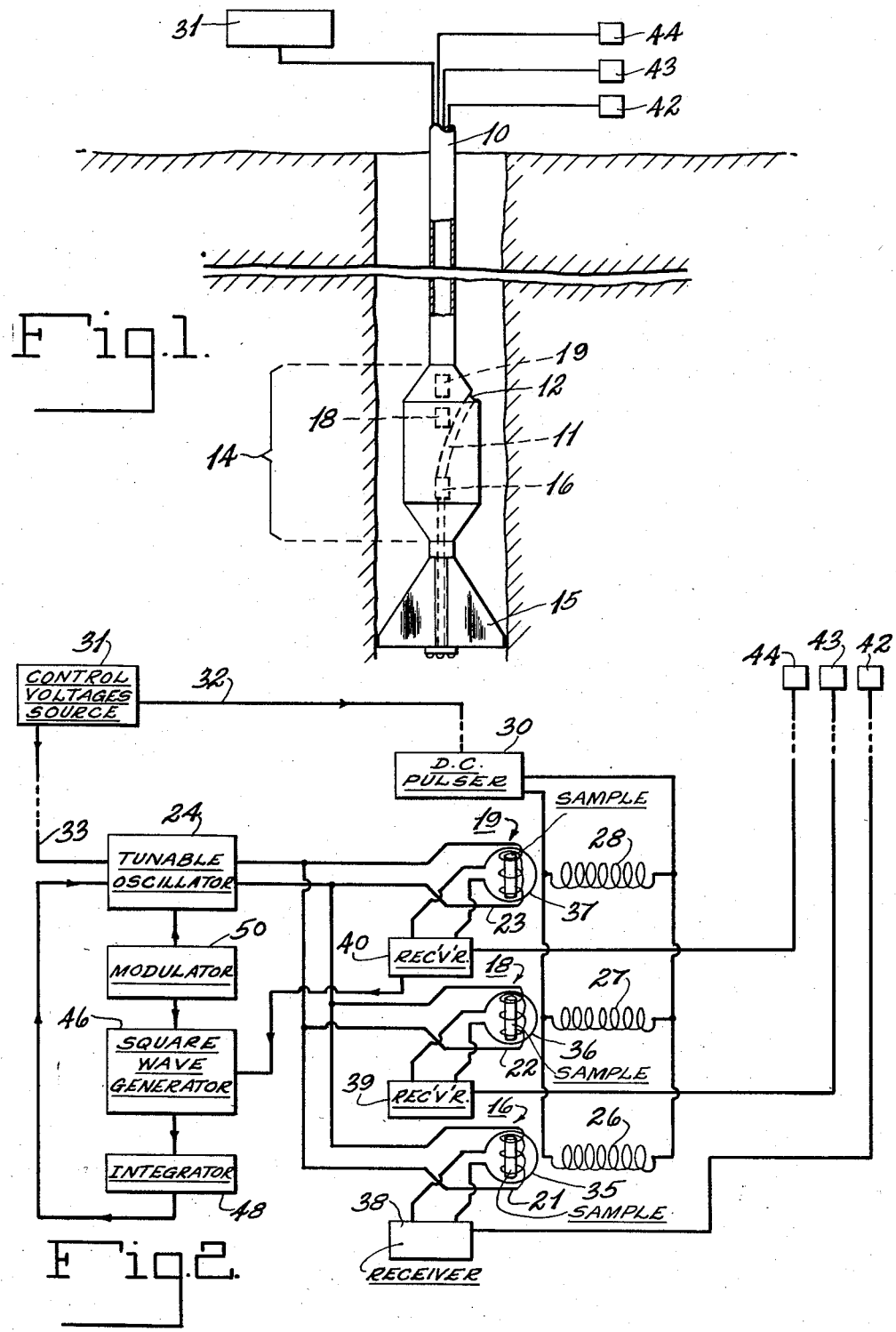

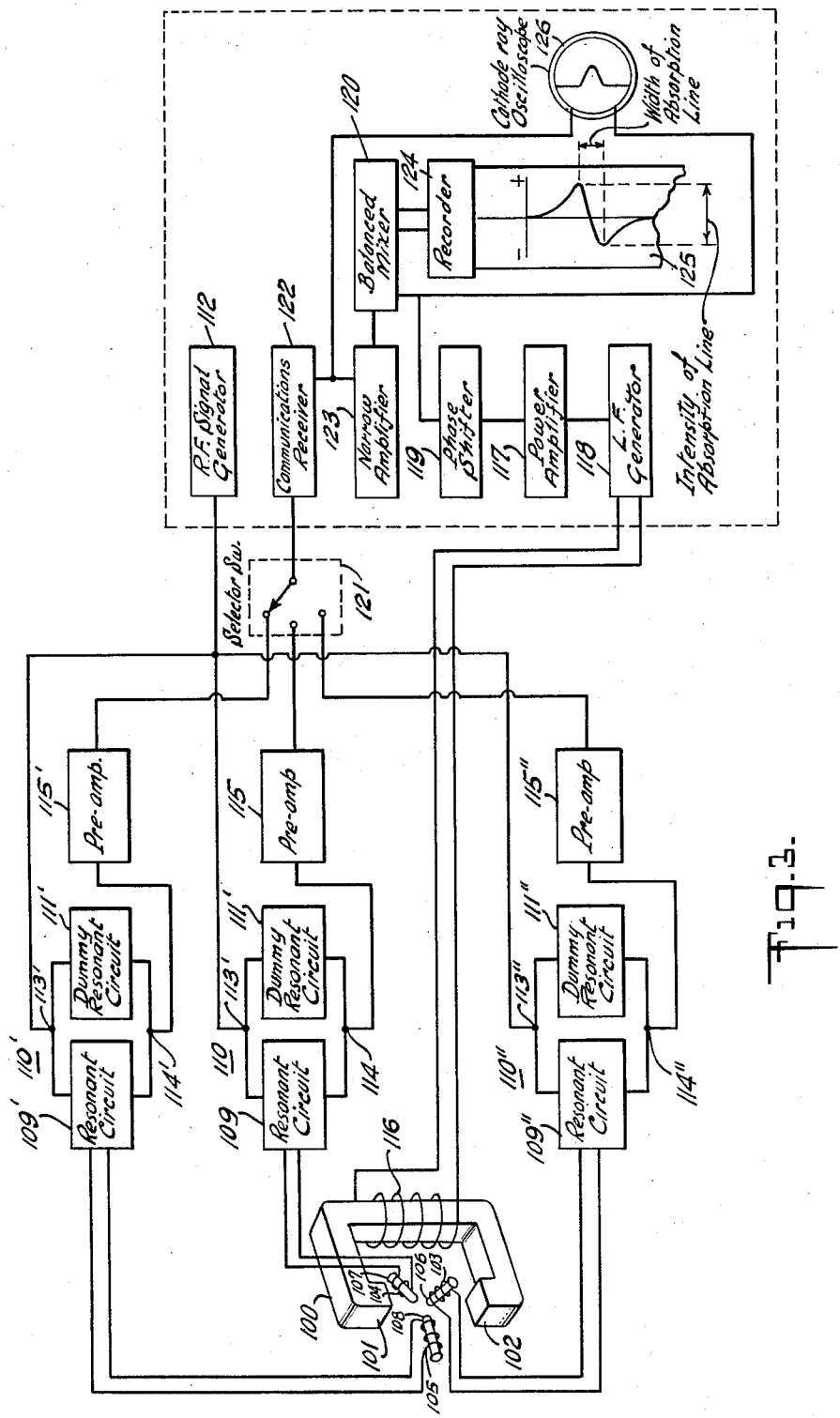

2,912,641

ANALYSIS TECHNIQUES BASED ON NUCLEAR MAGNETIC RESONANCE

Raymond J. Ruble, Dobbs Ferry, N.Y., assignor to Texaco Development Corporation, New York, N.Y., a corporation of Delaware Application July 27, 1956, Serial No. 600,580

22 Claims. (Cl. 324—.5)

This invention relates to improvements in methods and apparatus of non-destructive analysis based on nuclear magnetic resonance and more particularly to improvements in such methods as they are employed in geophysical exploration, for example, in bore hole logging.

This application is a continuation-in-part of U.S. Serial No. 357,951, filed May 28, 1953 (now abandoned) and U.S. Serial No. 364,775, filed June 29, 1953 (now abandoned) and contains substantially the same disclosure as Serial No. 357,951.

As is known it is possible to use these nuclear resonance analysis techniques to obtain two kinds of information: (1) information as to whether a sample contains any of a number of elements which are capable of exhibiting nuclear resonance, and (2) information as to the kind(s) of molecules in which any such nuclei which may be present are bound. For example, as is disclosed in one or more of several copending applications which are assigned to the assignee hereof; i.e., applications: Serial No. 238,754, filed July 26, 1951 (now abandoned); Serial No. 368,547, filed July 17, 1953 (a continuation case of 238,754); Serial No. 352,559, filed May 1, 1953 and Serial No. 353,746, filed May 8, 1953, it is possible to use techniques based on nuclear magnetic resonance to determine "in situ" whether or not a sample obtained from or comprised in an earth stratum traversed by a bore hole contains the particular element, hydrogen, and, if it does, whether the hydrogen is a constituent thereof as part of a hydrocarbon substance or of water.

Two essential steps are involved in obtaining the first kind of information: (1) the sample must be initially magnetized by a relatively strong uni-directional magnetic field and (2) it must then be permeated by a relatively weak magnetic field of transverse orientation which rapidly alternates at exactly the rate at which nuclei, whose presence it is sought to determine, will be gyromagnetically precessing in the uni-directional field for any given intensity thereof.

Because of this an oscillator which is used for supplying the energy for transversely permeating the sample must be adjusted so that, for a given modulation range, where the oscilaltor is frequency-modulated, or for a given spectral range, where it is pulse modulated, either the carrier or some strong side band will coincide with the precession frequency of the nuclei once during each modulation cycle.

If it is not so adjusted an analysis may fail to reveal that the sought-for nuclei are present in a sample even though in point of fact they are. Thus, if an apparatus is arranged to produce a binary type of output wherein the presence and absence of a given signal, such as of the ringing of a bell, are intended to indicate respectively the presence or absence of the nuclei, the latter will actually be an ambiguous, and therefore unreliable, indication since it may mean either (as intended) the absence of the nuclei or simply that there is a maladjustment of the oscillator which renders the apparatus incapable of producing the signal despite their presence in the sample. Accordingly, it is one object of this invention to provide for signalizing maladjustments of the oscillator and/or for automatically maintaining an appropriate adjustment thereof even if the apparatus is at a very remote location and out of sight with respect to the operator, e.g., at the end of a long cable deep within a bore hole.

Accordingly it is another object of this invention to devise an improvement in certain methods of analysis based on nuclear magnetic resonance by including therein an additional step of continuously monitoring the operativeness of the frequency adjustment of the oscillator which provides the energy for permeating the tested sample with a transverse field by also exposing to the analysis an auxiliary sample known to include a certain kind of nuclei constituting a spin system of known responsiveness to the method to signalize on the basis of responses obtained therefrom the existence of an operative adjustment of the oscillator and/or to maintain such an adjustment, signals indicative of the adjustment of the oscillator being electrically transmittable over long conductors and therefore available even if the apparatus is at a very remote location and out of sight with respect to the operator, e.g., at the end of a long cable deep within a bore hole, or at a distant location in a chemical processing system being monitored through nuclear magnetic analysis techniques.

In general the attainment of these objectives is made possible by providing the test apparatus with an auxiliary detector head containing a sample which is known to include the sought for type of nuclei and which is both immersed in a uni-directional field of the same strength as a principal detector head used for studying the unknown sample and permeated with a transverse field which alternates at the same rate as that permeating the principal detector head whereby the auxiliary detector head will continuously produce an output signal unless the apparatus becomes maladjusted Thus an operator on seeing no signal from the principal detector at the same itme that the auxiliary detector is producing a signal can rely upon the absence of signal as meaning that the unknown sample does not include the sought for nuclei. It is contemplated that improved apparatus may be provided which includes the auxiliary detector head and means associated therewith for generating "error" signals representative of any driftings in the frequency of the oscillator and for applying these signals back to the oscillator to effect automatic frequency control thereof.

The above-mentioned two essential steps (of "magnetizing" and "permeating") are also used in obtaining the second kind of information mentioned above, i.e., information as to how nuclei of a given kind, which have been found to be present, are bound. However for such tests the magnetizing and permeating must be accomplished in certain very precise ways in order to produce effects based on differences in the "relaxation times" of differently bound but otherwise identical nuclei. For example, in one suitable procedure the initial magnetization of the sample is effected in a precisely limited interval of time of a duration which is selected to be adequate for establishing "equilibrium" of protons (hydrogen nuclei) if they are bound in certain hydrocarbon substances, e.g., crude oil, but not for establishing equilibrium thereof if they are bound in water. The selection of a proper interval of time usually involves making a careful compromise. For while it is true that simply using the shortest-possible intervals will tend to emphasize the selective nature of the test, i.e., emphasize its ability to distinguish between hydrocarbon bound and water bound protons, such intervals will have the disadvantage of reducing the strength of the signal which can be derived from any given number of the sought-for nuclei therefore adversely affecting the "signal-to-noise" ratio and making it possible that small numbers thereof will not be detected at all. Moreover, for different circumstances different intervals of time should be selected as optimum, since the relaxation times of nuclei are actually variables depending on other factors than merely the types of molecules in which the nuclei may be bound, including such variable factors as temperature, pressure, and the extent to which para-magnetic materials may be present in or near to the sample. Thus an interval of time which may be excellent for making tests in a portion of a bore hole near the surface of the earth, may be so unsatisfactory for a portion thereof located at great depths below the surface that signals which are normally intended to indicate the presence of hydrocarbon bound protons and nothing else will start to be produced in response to mere water contained in the drilling mud. Therefore, if the apparatus is arranged to produce a binary-type of output, the presence of the signal, as well as its absence, can turn out to be unreliable and ambiguous. What can be done, of course, is to reduce the time interval to make up for the fact that under the conditions which obtain at the place where the test is being made water bound protons have shorter relaxation times than they had at the start of the logging run. However if the interval is made too short the result may be a complete absence of the signal not because of a complete absence of hydrocarbon bound protons, as intended, but because the apparatus cannot produce a signal which is observable above the background noise in response to relatively small numbers of such protons.

Accordingly it is another object of this invention to devise an additional improvement in certain methods of analysis based on nuclear magnetic resonance by including therein an additional step of monitoring the operativeness or lack thereof of the apparatus for its intended purpose of distinguishing between nuclei which are themselves of a single kind but are bound in different kinds of molecules, i.e., are "differently bound," to signalize to an operator its ascertained condition of operativeness or inoperativeness, the signals being electrically transmittable over long conductors and therefore available even if the apparatus is at a very remote location and out of sight with respect to the operator. It is a further object to provide improved means for assuring accurate operation of nuclear magnetic resonance analysis apparatus for distinguishing between differently bound nuclei.

In general the attainment of these objects is made possible by providing the test apparatus with 2 auxiliary detector heads each containing a sample which is known to include the sought-for type of nuclei but with the nuclei of the respective samples bound in different kinds of molecules; immersing both auxiliary detector heads in a uni-directional field of the same strength as that in which a principal detector head is immersed; and permeating both auxiliary detector heads with a transverse field which alternates at the same rate as that permeating the principal detector head whereby, upon proper adjustment of the apparatus such as upon proper adjustment of the interval of time over which the samples are magnetized, one of the auxiliary detector heads will produce an output signal for every test cycle and the other auxiliary detector head will not produce an output signal for any test cycle. Thus an operator on seeing a signal from the principal detector under these circumstances can rely upon it as meaning: (1) that the unknown sample does include the sought-for nuclei; and (2) they are bound in a certain way. Moreover the operator, at times when he sees that there is no signal coming from the principal detector head, can maximize the sensitivity of the principal detector by lengthening the time interval over which all of the samples are magnetized to a duration just a trifle shorter than that at which both auxiliary detectors would begin to produce signals continuously, this being readily possible, even where the operator is located at a great distance from the detector, through the use of any of a variety of known electrical circuit expedients.

Finally, if the operator should observe continuous signals coming from both detector heads regardless of how he adjusts the apparatus, he can conclude that it is useless to continue the test.

In the drawing:

Fig. 1 represents an arrangement wherein the improvements herein may be utilized in connection with a type of nuclear magnetic resonance logging which can be conducted continuously with and as a part of a bore hole drilling operation;

Fig. 2 is a schematic block diagram of an embodiment of this invention;

Figure 2A:
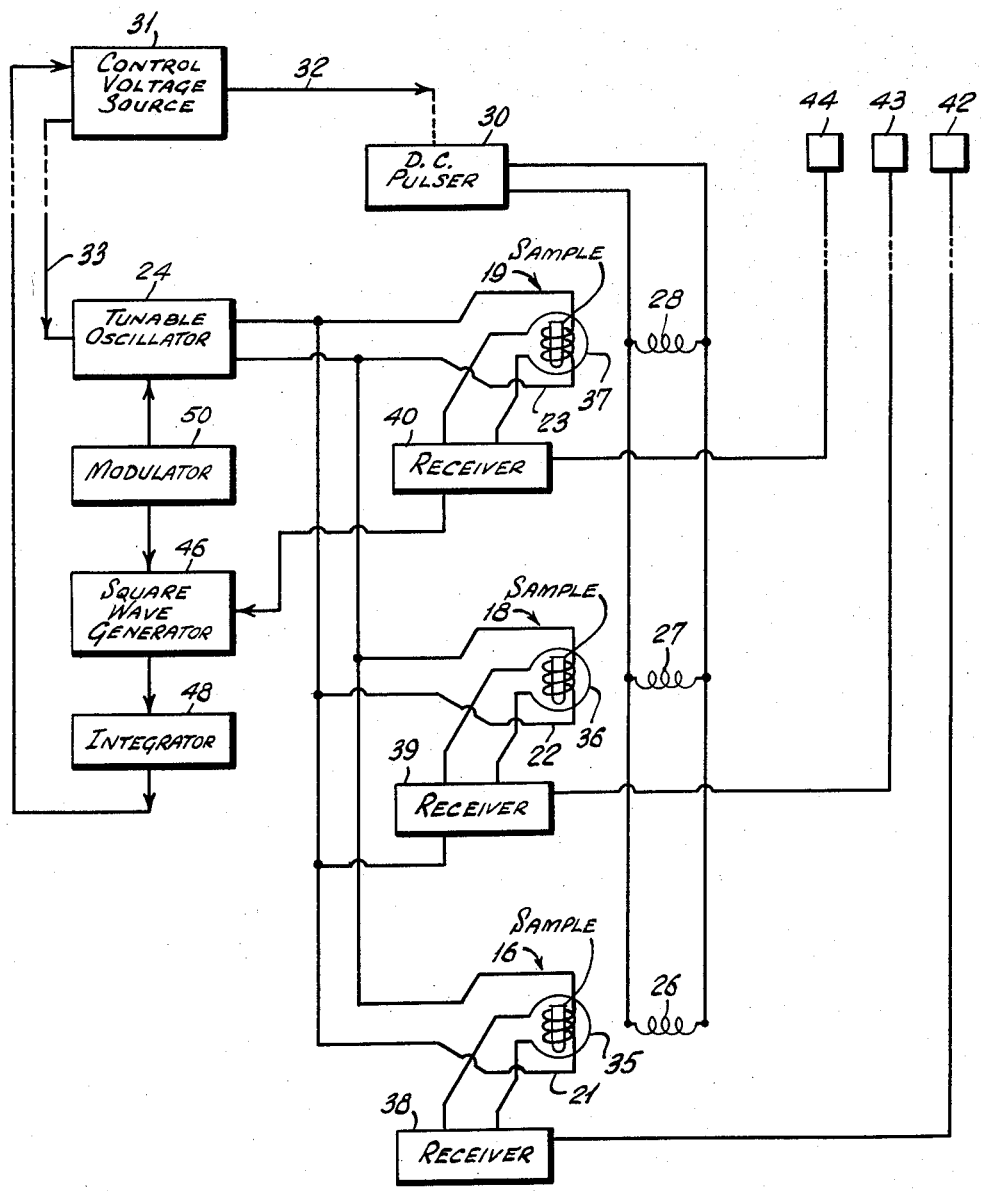
Fig. 2a is a schematic block diagram generally similar to Fig. 2 showing still another embodiment of the invention and, Fig. 3 is a schematic block diagram of another embodiment of this invention.

The apparatus shown in Fig. 1 is of the same general type as that disclosed in the above-mentioned copending application Ser. No. 353,746, filed May 8, 1953 (D#35,015). It comprises a drilling stem 10 carrying at its lower end a bit 15 which is adapted to produce a continuous core which, as drilling progresses, is carried up a conduit 11 through the body of the bit and part of the hollow interior of the bottom section of the drilling stem, and eventually is ejected into the mud filled annulus surrounding the stem from an orifice such as that shown at 12. The lower section of the drilling stem comprises an enlarged portion 14 which is double-walled to provide an hermetically sealed annular cavity wherein components and circuit elements of the nuclear resonance apparatus may be housed. As in the apparatus shown in the last-mentioned copending application a tubular detector head 16 is mounted coaxially with the conduit 11 so that a core which is progressively developed and forced through the conduit will necessarily pass through it. Since it is this detector head 16 that makes the most useful tests, those of unknown samples derived from actual earth strata, it will herein be designated as the "principal" detector head. In the improved apparatus shown herein 2 additional "auxiliary" detector heads, 18 and 19, are employed which may also be mounted within the hollow center of the lower section of the drilling stem, as shown in Fig. 1, or, for that matter, in a variety of other suitable locations near that of the principal detector head. In any case they should normally be mounted close enough to the principal detector head so that the known samples which they contain will be affected in about the same ways as the unknown sample by usch influences as temperature and pressure changes. Only in this way will the auxiliary detectors be most reliable for these intended monitoring purposes and will an operator be able to make suitable readjustments of the operating conditions of the principal detector head as they are required.

In the normal use of the apparatus shown in Fig. 1 it is quite likely that some of the drilling mud will pass through the principal detector head along with sample, i.e., along with the continuous core. Therefore, since the drilling mud is usually a water mix, it is important that the apparatus be adjustable to distinguish between hydrocarbon-bound and water-bound protons and to continue to do so as various changes occur in certain ambient conditions at the location of the bit as drilling proceeds. And it is also for this reason that the known sample contained in one of the auxiliary detector heads 18 should contain water-bound protons. Preferably, this known sample should be carried in a sealed container so that its essential character will be preserved even though it is continuously immersed in a moving column of drilling mud. To this end it may either be sealed into a hollow opening which extends through the tubular detector head, e.g., by being cemented therein, or, as as alternative, the entire head, with the sample merely inserted within said hollow opening (and even loosely if this be desirable for any reason) may be placed within a sealed envelope. However, the changing conditions which will unavoidably influence the unsealed unknown sample and therefore must be made to similarly influence the known monitoring samples will include some, e.g., changes in hydrostatic pressure and contamination with para-magnetic substances, which, unlike temperature changes, may not be effective through a sealed envelope if it is rigid and/or totally encloses the detector head. Accordingly, where it is desired to duplicate at the known samples changes in hydrostatic pressure which are exerted on the unknown sample, these samples may be enclosed within flexible envelopes such as plastic envelopes or metal envelopes having sylphon type side walls, and, where it is desired to permit the circulation of some of the drilling mud through the auxiliary detector heads so that any contaminants which may be intermixed therewith may similarly influence all of the samples, the known samples may be placed directly within envelopes which are small enough to be loosely fitted within the tubular auxiliary detector heads. However, where this is done with apparatus of the kind shown in Fig. 1 it would be best to relocate the auxiliary detector heads so that the mud which will circulate through them will be the mud containing the most recent cuttings from the formation, i.e., mud moving upward around the outside of the bottom section of the drilling stem rather than the downward moving column of mud contained centrally within it. To this end appropriate open recesses may be formed in the outer surface of the lower section into which the auxiliary detector heads may be mounted or, where it is desired to cover over the detector heads, e.g., to protect them, and conduits, not shown, may be provided for permitting some of the mud to be forced by the rotation of the stem into and through the auxiliary detector heads from the annulus which surrounds the outside of the stem immediately above the bit.

From the foregoing and for reasons already explained above it will be apparent that the known sample which is to be used in the other auxiliary detector head 19 should contain the sought-for nuclei bound in a sought-for kind of molecule (rather than in water), e.g., it should contain hydrocarbon-bound protons.

The apparatus shown in Fig. 2 comprises a principal detector head 16 and 2 auxiliary detector heads 18 and 19. Each of these detector heads comprises an R.F. transmitter coil 21, 22 and 23 respectively, all of which are fed from a common oscillator 24. To the end that it can be conveniently adjusted automatically and/or from a remote location, the oscillator 24 may be preferably be of a type which can be tuned by varying the magnitude of a direct potential which is applied to some part thereof. For example, it may comprise a reflex kylstron whose operating frequency can be varied by varying its D.C. reflector voltage; or a magnetron which can be frequency modulated and/or tuned by modulating or readjusting an appropriate parameter of an electron beam projected through one of its cavities; or a tank circuit associated with a hard triode reactance tube or a gas diode in any of a number of known suitable ways whereby an effective reactance contributed to the tank circuit by the discharge device and thereby the anti-resonant frequency can be varied by varying a D.C. voltage applied thereto.

Test apparatus according to this invention should preferably comprise means for flooding the detector head 16, 18 and 19 with uni-directional magnetic fields of substantially equal flux densities, such as 3 separate similarly wound electro-magnets 26, 27, 28, or if preferred a single equivalent common magnet with a suitable low-reluctance circuit to distribute the flux to all three detector heads. As in the embodiment shown herein, the magnets 26, 27 and 28 may be fed in parallel with pulses of direct current from a D.C. pulser 30. The pulser 30 may comprise either an arrangement including: (1) a source of direct current; (2) an electronic switch for periodically connecting it to the magnets 26, 27 and 28 for measured intervals of time; and (3) a pulse generator for actuating the electronic switch, or, if preferred, an arrangement including: (1) a pulse generator and (following it) (2) enough stages of amplification to raise the amount of power contained in each of the pulses to the necessary level for energizing the magnets 26—28. In either case a pulse generator should be used. A variety of suitable pulse generators (and even entire D.C. pulsers) are known to the art, many of them having been developed for the modulation of radar transmitter tubes. Therefore for purposes herein it would seem to be unnecessary to describe these components in further detail. One requirement which should be met is that the pulser 30 can be conveniently controlled from a remote location, e.g., by the application of a variable D.C. voltage to one of its elements to change the duration of the pulses which it produces.

The Fig. 2 apparatus comprises a component, herein represented by block 31, which is adapted to provide at least two control D.C. voltages which an operator may vary in magnitude at will. One of these voltages is applied to the pulser 30, over a conductor 32, to control the durations of the pulses which it feeds to the magnets 26—28 and the other is applied to the tunable oscillator 24, over a conductor 33, for adjusting its operating frequency. The lines used in Fig. 2 to represent the conductors 32 and 33 include dotted portions to indicate that these conductors may be of any length necessary to permit the source 31 to be remotely located with respect to the rest of the apparatus. Thus in a practical embodiment of this invention most of the components and circuit elements shown in Fig. 2 may be located in the above-mentioned annular cavity in the bottom section of the drilling stem at the same time that the source 31 is located on the earth's surface at the top of the bore hole.

Each of the detector heads 16, 18 and 19 comprises a respective receiver pick-up coil (35, 36, 37) and an associated receiver (38, 39, 40) to whose input terminals the coil is connected. As is known it is possible to make nuclear magnetic resonance tests by either the so-called "absorption" method in which attainment of the condition of nuclear resonance can be detected through a change which it affects upon the input impedance of the transmitter coil or the so-called "induction" method in which it can be detected through interception of a signal comprising a subsequent retransmission by the spin system of part of the R.F. energy which it absorbs upon attainment of resonance. While the apparatus shown in Figures 1 and 2 embodies the induction method it is to be understood that the present improvements may be equally well applied to other nuclear magnetic resonance types of apparatus. Although, it is believed unnecessary to disclose in equal detail herein just how the present teachings would be applied to all such other apparatus, since those skilled in the art will be readily able to do so once they have understood the nature of the present improvements; nevertheless an additional embodiment of the invention, as related to the absorption method, is illustrated in Figure 3.

As is known, each of the receivers 38—40 will normally comprise one or more stages of R.F. amplification to increase the amplitude of the R.F. signal which reaches it from its associated pick-up coil; a detector to extract the modulation envelope of the R.F. signal, e.g., low frequency (audio and/or video) components thereof; and a low frequency amplifier. Depending upon whether, on the one hand, (1) the range over which the oscillator 24 is modulated is greater than the pass band of the receiver or, on the other hand, (2) its modulation range is not greater or it is pulse modulated, the receiver may be (1) automatically tuned back and forth over an appropriate band of frequencies in synchronism with the modulation of the oscillator 24, or (2) it may be tuned to a fixed frequency band. While all of the receivers 38—40 are adapted to transmit their output signals to indicating and/or recording devices 42, 43, 44, which will normally be positioned at the head of the bore hole at or near the location of the control voltages source 31, one of them, namely the receiver 40 is particularly adapted to produce a control voltage, i.e., a "stop" trigger, which serves a useful purpose in an arrangement for automatically controlling the frequency of the carrier generated by the oscillator 24. The arrangement in question comprises: (1) a square wave generator 46 which is adapted to respond to a "start" trigger to start to produce a voltage square wave and to respond to the stop trigger to stop producing it; (2) an integrator 48 for converting the output of the square wave generator into a D.C. voltage which may be applied to the tunable oscillator to control its frequency automatically and thus supplement the manual control thereof which is effected by application of another D.C. voltage to the oscillator over the conductor 33. The start triggers are applied to the generator 46 from one of two outputs of a modulator 50. This modulator has the principal function of cyclically tuning or "frequency modulating" the oscillator, e.g., by applying a train of saw-tooth voltages thereto from one of its outputs to cause the oscillator's center frequency periodically to move initially at a relatively slow rate in one direction across a predetermined frequency band in a substantially linear manner and then to move back across the band in the opposite direction at a relatively very fast rate to the starting frequency. In addition the modulator should be adapted to provide at its second output a "start" trigger pulse at and in synchronism with the start of each saw tooth voltage. Since a large variety of suitable ways of doing this are available in accordance with the prior art it is believed to be unnecessary to describe any of them in detail herein. However, by way of example it is noted that one suitable way would be to differentiate a square wave, which may be employed in the modulator, according to one widely preferred practice, for turning on and off a switch tube which in turn is used to control the chargings and dischargings of a saw tooth generating R.C. circuit, and to utilize as the start trigger the transient which will be produced by differentiation of the leading edge of said square wave. Similarly, it may be found expedient to include a differentiator in the circuitry of the receiver 40 in order to derive a sufficiently short and steep transient from the "signal" which passes through it upon each attainment of nuclear resonance to serve as a stop trigger.

It is apparent from the foregoing that by use of the improvements disclosed herein it is possible to avoid all of the ambiguities referred to above. Thus so long as signals continue to be present at the indicator 44 of the auxiliary receiver 40 an absence of signal at the indicator 42 of the principal receiver 38 will reliably mean that substantially no protons are present in the unknown sample and cannot simply be a manifestation that the oscillator 24 is out of adjustment, and so long as no signals are present at the indicator 43 of the auxiliary receiver 39 the presence of signals at the indicator 42 will mean that protons are present in the unknown sample and, in most bore hole logging situations, that most likely they are hydrocarbon-bound, and it cannot mean that the protons may be water-bound.

If desired the apparatus shown herein can be simplified by eliminated the auxiliary detector head 19, the receiver 40, the indicator 44, the square wave generator 46, and the integrator 48 and yet by operating the remaining portion in such a way that from time-to-time the auxiliary detector head is used for monitoring the oscillator adjustment while the logging operation is temporarily suspended this can be done without sacrificing any more than the automatic frequency control feature. In such an operation of a thus-simplified apparatus periodic spot checkups and manual re-adjustments of the oscillator are made by temporarily manually increasing the duration of the D.C. pulses produced in the pulser 30 and the manually re-adjusting the frequency of the oscillator, if this be necessary, until signals appear at the indicator 43.

The apparatus of Fig. 2a is similar to that shown in Fig. 2 and corresponding elements are identified with the same reference numerals. This apparatus differs from that of Fig. 2 in that the control signal derived from the output of the integrator 48 is applied to the control voltage source 31 in order to provide an arrangement whereby the D.C. pulser 30 may be controlled as a function of the monitor signal, as well as the tunable oscillator 24.

The apparatus of Figure 3 comprises means for producing a uni-directional magnetic field, shown as a permanent magnet 100 having a pair of spaced poled pieces 101—102 defining an air gap. Within the field of the magnet between its pole pieces 101—102 and perpendicular to its magnetic axis there is provided a principal detector head or coil 103 together with first and second auxiliary detector coils 104—105. The principal detector coil 103 and the secondary detector coils 104—105 are all positioned in substantially the same plane, transverse to the magnetic flux provided by the magnet 100 in order to assure that each resides in a region of magnetic flux that is substantially identical with that of the other two. Each of the detector coils 103—105 is provided with a respective sample container 106—108 which may be in the form of a vial located within the respective coil. The principal coil 103 is part of a resonant circuit 109. The resonant circuit 109 is connected in an R.F. bridge 110 with a dummy resonant circuit 111 which has the same characteristics as the first resonant circuit when the latter is not undergoing nuclear resonance. A variable R.F. signal generator 112 is connected through a cable to one side of the bridge between the resonant circuits 109, 111 at a point 113. The mixing point 114 on the other side of the bridge is connected to a preamplifier 115. The section of the bridge 110 between the point 114 and the resonant circuit 109 is selected to introduce a half wave shift by conventional means. By way of example, this may be achieved by making the electrical length of the connection between the point 114 and the resonanat circuit 109 one-half wave length longer than the electrical length of the connection between point 114 and the dummy resonant circuit 111. In the alternative, the electrical length of the connection between the point 113 and the circuit 109 may be one-half wave length longer than the electrical length of the connection between point 113 and the circuit 111. Consequently, the signal arriving normally at the mixing point under non-resonant conditions is practically zero.

Each of the secondary detector coils 104—105 forms part of a respective resonant circuit 109, 109', 109" and has associated therewith an R.F. bridge, dummy resonant circuit, and pre-amplifier, corresponding to the similar components associated with the principal detector coil and bearing the same reference numerals as the corresponding components associated with the principal coil 103, but distinguished by prime and double-prime marks, respectively. The R.F. signal generator 112 is also coupled to one side of each of the bridges between the resonant circuits of the respective secondary coils.

A low frequency modulating coil 116 is wound around the permanent magnet 100 in coaxial relationship. It is connected through the cable to a power amplifier 117 that receives current at a low frequency (say 30 c.p.s.) from an L.F. generator 118. The power amplifier 117 also feeds a conventional phase shifter 119 which, in turn, feeds a balanced mixer 120 (balanced modulator) with current at 30 c.p.s.

The output of each of the respective preamplifiers 115, 115', 115" is selectively fed through a selector switch 121 to a communications receiver 122 which, in turn, feeds a narrow band amplifier 123 (30 c.p.s.), the output of which is also sent to the balanced mixer 120.

The selector switch 121 affords means for selectively coupling one of the respective preamplifiers associated with a desired one of the detector coils to the communications receiver 122.

The output of the balanced mixer 120 is fed to a recorder 124 which produces a record 125. If desired, an additional indication of the condition of the R.F. bridge containing the detector coil may be obtained with a conventional cathode ray oscilloscope 126 whose horizontal plates are driven by the amplified phase-shifted 30 c.p.s. output of the low frequency generator.

A nucleus (say a nucleus of hydrogen contained in a hydrocarbon molecule in the sample) under the influence of the field produced by the permanent magnet, will precess about the direction of the lines of force in the field with a frequency.

$$f = \frac{\text{magnetic field strength}}{\text{Planck's Constant}} \times \frac{\text{Magnetic moment of nucleus}}{\text{Angular momentum}}$$

If the R.F. generator is adjusted so that its output is of the same frequency, a condition of nuclear resonance is attained and the nucleus will absorb energy from the circuit. The amount of absorption, i.e. the net number of nuclei excited per unit time, is indicated by the amount of unbalance that results at the mixing point. It is the function of the rest of the apparatus to measure the amount of unbalance as compared to a reference value.

There should be a small phase or amplitude unbalance signal present at resonance. If amplitude unbalance is used, absorption is displayed. If phase unbalance is used, phase-shift or "dispersion curve" is displayed on the oscilloscope employed.

If a substantially homogeneous D.C. magnetic field is produced in the sample in which nuclear resonance phenomena is measured, the reference value for the unbalance signal is obtained by sweeping the field produced by the permanent magnet in the sample back and forth through the resonance value. A low frequency alternating current passed through the modulating coil brings this about. This current is supplied by the low frequency generator through the power amplifier. Current of 30 c.p.s. is suitable for modulation or sweep purposes and will produce a persistent image of the unbalance signal on the cathode ray oscillograph. The signal is placed on the vertical plates of the cathode ray oscillograph while its horizontal plates are driven by the 30 c.p.s. current, and the oscillograph trace, as shown in Fig. 1, is a peak rising from a level background. The height of this "resonance" peak is a measure of the amount of resonance taking place and hence of the concentration of the hydrogen-containing compound, say a hydrocarbon, for which the apparatus is tuned.

The cathode ray oscillograph is convenient for recording purposes (but allows too much noise to interfere with the signal) and in practice is employed primarily for adjusting the apparatus. A large number of recording systems may be employed, but that illustrated is particularly useful. Its principal elements are the narrow band amplifier and the balanced mixer (or balanced modulator), and the output of the system (as shown on the record) is the derivative of the absorption curve shown on the cathode ray oscillograph. The small field modulation employed produces a 30 cycle signal at the output of the communication receiver. If a narrow sloping portion of the peak is scanned, the receiver output is a 30 cycle wave, the amplitude of which is a measure of the slope of the portion of the peak in the scanning range. The 30 cycle wave is amplified in the narrow band (30 cycle) amplifier, the output of which is a sinusoidal wave whose amplitude is still a measure of the slope of the absorption curve or peak. This sinusoidal signal and the 30 cycle wave from the L.F. generator are mixed in the balanced mixer circuit, which gives a D.C. output proportional to the slope.

If a substantially homogeneous D.C. magnet field is produced in the sample in which nuclear resonance phenomena is measured and the magnetic field is varied through the resonance value by varying the current in the modulating coil wound on the magnet, a curve is traced by the recorder which is a plot of the magnitude of the unbalance signal, which may be either plus or minus, against the magnetic field strength. As shown in Fig. 1, the height of the absorption peak or intensity of line is measured by the sum of the maximum and minimum distances from the base line along the horizontal axis of the record. These maximum and minimum distances actually measure the maximum and minimum slopes of the absorption line, but these are themselves a measure of the height to which the absorption line rises. The line width is indicated by the vertical distance from the maximum to the minimum of the curve.

The relaxation time can be calculated from the height of the absorption peak by the method described by Bloembergen, Purcell and Pound in section IV of their article in Physical Review 73 p. 679 (1948).

The resonant frequency is, of course, obtained directly from the setting of the variable R.F. signal generator.

The hydrogen nuclei (protons) in pure water at room temperature have a relatively long relaxation time (about 2 seconds) and those in typical crude oil at room temperature have a relatively short relaxation time (of the order of 0.1 second or less). Under the conditions of absorption dynamic equilibrium is obtained. The rate at which energy is absorbed from the R.F. coil depends on the rate at which excited nuclei are de-excited. Hence, the short relaxation time characteristic of the hydrocarbons allows a greater energy absorption and thereby a stronger signal.

The presence of paramagnetic material in the sample, tends to decrease the relaxation time by increasing the coupling of the lattice to the nuclear moment, say to that of protons in water. If the sample be an earth formation, for example, the paramagnetic salts in the formation are ordinarily soluble in water but not in crude oil. Hence the presence of such salts tends to reduce the relaxation time in water, but they do not appreciably affect the relaxation time in hydrocarbons. In consequence, the difference in observed relaxation time for water and hydrocarbon proton magnetic moments will become smaller, and it will become more difficult to get an indication of the presence of hydrocarbons in the sample as the concentration of paramagnetic materials in or adjacent thereto increases. Free oxygen is paramagnetic as are iron, cobalt, nickel, chromium, copper, manganese and their ions, iron ammonium alum and potassium ferricyanide.

In carrying out the principles of the present invention with the apparatus of Figure 3, an unknown sample may be placed in the principal detector head and samples of the sought for type of nuclei may be placed in the two auxiliary detector heads with the nuclei of the respective auxiliary samples being bound in different kinds of molecules. Since the principal and two auxiliary detector heads are immersed in a common uni-directional field of the same strength and permeated with a common transverse field, the samples of the two auxiliary coils may be employed as monitor samples. The resonance condition of the principal sample and auxiliary samples may be individually observed through operation of the selector switch to couple the desired detector signal to the communication receiver and thus to the recorder and the oscilloscope for observation. Thus, an operator may compare an indication received from the principal detector with one or the other of the auxiliary samples in order to ascertain whether or not the response of the principal detector is a valid indication of the presence of the sought-for nuclei in the unknown sample of the principal detector. It is also possible through use of the monitor samples to adjust the apparatus such that a positive, i.e., definite signal is obtained from a selected monitor sample in order that the same field conditions may be applied to the unknown sample to determine whether or not identical nuclei or identically bound nuclei are present therein.

As in the case of the apparatus shown in Figure 1 of the aforementioned application S. No. 368,547, the apparatus of Figure 3 may be incorporated in a well logging instrument or in the actual drilling equipment so that the logging head is carried close to the bit as the latter penetrates into the ground. In this fashion, the well is logged as it is drilled and hydrocarbon-containing structures are detected as soon as they are encountered. In still another procedure, the logging head is held stationary at a series of levels in the bore. At each level, the R.F. frequency to the detector coil is varied over a substantial range and the frequencies corresponding to the maximum absorption signal at each level is noted. In this fashion a log is obtained in which frequency for maximum absorption signal is plotted against well depth. Such logs, taken in different wells in the same field, are useful for correlation purposes.

The foregoing procedure may be varied by periodically varying or sweeping the frequency of the applied R.F. wave over a predetermined range as the logging head is drawn continuously along the well bore. Again, maximum absorption signals are observed and correlated with well depth, the result being a log which is useful for correlation purposes.

The location at which nuclear resonance occurs is determined by the strength of the D.C. magnetic field and the frequency of the R.F. field. Thus, if the logging head is held stationary at selected levels in the well bore, the depth of invasion of the formations by the drilling fluid, acidizing solutions, etc., can be measured by varying the strength of the D.C. magnetic field over a wide range. In this fashion logs are obtained showing the characteristics of the formations along planes disposed perpendicularly with respect to the well bore.

In the apparatus of Fig. 3, the signal indicating the attainment of a condition of nuclear resonance adjacent the logging head is the result of absorption of energy from the R.F. circuit including the detection coil, the process having been designated as one of "nuclear absorption." The attainment of the condition of nuclear resonance may also be indicated by a phase shift of the signal in the energizing R.F. circuit (nuclear dispersion).

As will be understood by those familiar with the art, the term "uni-," as used herein with respect to the direction of a magnetic field, is not intended to mean that the direction of every part of the field is the same, though in some instances this may incidentally be true, but rather that the direction of any part thereof, such as the direction of one of its so-called flux lines remains the same over time, as will be true in the case of a field which is produced by a direct current electro magnet or a permanent magnet as contrasted to a field which is produced by an alternating current electro magnet. Accordingly, it is intended that the fringing field surrounding a permanent bar magnet is within the purview of the term "uni-directional magnetic field" as it is used herein and that similarly a substance which is immersed in said field will be uni-directionally magnetized in accordance with the meaning intended for this language as it is used in the specification and the claims.

It is to be understood that the principles of the invention may be applied to various types of analysis by means of nuclear magnetic resonance principles. For example, the principles of the invention may be employed in laboratory analysis and chemical processing plant monitoring of chemical processes, as well as logging of bore holes.

Obviously many modifications and variations of the invention as hereinabove set forth may be made without departing from the spirit and scope thereof and therefore only such limitations should be imposed as are indicated in the appended claims.

I claim:

1. In a method for non-destructively analyzing a sample under certain ambient conditions by taking steps to induce nuclear magnetic resonance therein the improvement of including an additional step of simultaneously under said ambient conditions inducing nuclear magnetic resonance in a monitoring sample known to contain nuclei having certain predetermined characteristics in order to obtain information relating to the method followed in analyzing the first mentioned sample.

2. A method for non-destructively analyzing a sample comprising the steps of: equally magnetizing unidirectionally constituent nuclei within both said sample and an additional monitoring sample known to contain nuclei having certain predetermined characteristics; permeating each of the samples with a magnetic field whose orientation is transverse to that of its uni-directional magnetization and which periodically reverses in direction at a rate substantially equal to the gyromagnetic precession rate of said nuclei of known characteristics under such unidirectional magnetization; and detecting a relationship between the precessions of said last-mentioned nuclei and the rate of said periodic reversals in direction to monitor the operativeness of the method with respect to the first-mentioned sample.

3. A method as in claim 2 in which the last-mentioned step comprises ascertaining whether a condition of resonance is effected between the precessions of the nuclei of known characteristics and said rate of periodic reversals.

4. A method for non-destructively analyzing a sample comprising the steps of: equally magnetizing uni-directionally constituent nuclei within both said sample and two additional monitoring samples known respectively to contain nuclei which are of a single kind but are bound in different kinds of molecules; permeating each of the samples with a magnetic field whose orientation is transverse to that of its uni-directional magnetization and which periodically reverses in direction at a rate substantially equal to the gyromagnetic precession rate of said single kind of nuclei under such uni-directional magnetization; and detecting respective relationships between the rate of said periodic reversals and the precessions of nuclei of said single kind contained in the respective monitoring samples to obtain information as to the operativeness of the method with respect to the first-mentioned sample.

5. A method as in claim 4 in which said last-mentioned step comprises ascertaining whether conditions of resonance are respectively effected between said periodic rate and the precessions of nuclei of said single kind contained in the respective monitoring samples.

6. A method as in claim 4 in which the sample to be non-destructively analyzed comprises an earth constituent obtained in geophysical prospecting and the analysis is directed at ascertaining whether the sample contains hydrocarbon bound protons and in which one of the monitoring samples comprises water-bound protons and the other comprises hydrocarbon-bound protons.

7. A method for non-destructively analyzing a succession of samples to ascertain whether any thereof contain nuclei having certain predetermined characteristics comprising the steps of: equally magnetizing uni-directionally constituent nuclei within respective ones of said samples taken one at a time as well as constituent nuclei of at least one additional monitoring sample known to contain nuclei having similar characteristics; permeating each of the magnetized samples with a magnetic field whose orientation is transverse to that of its uni-directional magnetization and which periodically reverses in direction at a rate substantially equal to the gyromagnetic precession rate of said nuclei of known characteristics when under such uni-directional magnetization; and detecting a relationship between the rate of said periodic reversals in direction and the precessings of said nuclei of the monitoring sample to adjudge the operativeness of the method with respect to individual ones of the first-mentioned samples.

8. A method for non-destructively analyzing a sample comprising the steps of: equally magnetizing unidirectionally constituent nuclei within both said sample and an additional monitoring sample known to contain nuclei having certain predetermined characteristics; permeating each of the samples with a magnetic field whose orientation is transverse to that of its uni-directional magnetization and which periodically reverses in direction at a rate which is variable over a range including the rate of gyromagnetic precession of nuclei having said known characteristics when they are under such uni-directional magnetization; seeking the presence of a detectable relationship between said periodic reversals and the precessings of said nuclei of known characteristics in the monitoring sample; and varying the rate of said reversals during said seeking until said relationship is observed to exist.

9. A method as in claim 8 in which said detectable relationship is a condition of resonance between said precessings and said rate.

10. In a method of non-destructively analyzing a number of earth-constituent increments extending along a geophysical reference, such as along the length of a bore hole, to ascertain whether any thereof contain a certain predetermined kind of nuclei, which method comprises the steps of magnetizing uni-directionally each of said increments individually and simultaneously permeating it with a magnetic field whose orientation is transverse to that of its magnetization and which periodically reverses in direction at a controllable rate, the improvement comprising the steps of: equally magnetizing uni-directionally, during the magnetization of one of said increments located in one region along said reference, a monitoring sample which is known to contain nuclei of said certain kind and is similarly located; permeating the sample during its magnetization with a magnetic field whose orientation is transverse to that of its magnetization and which periodically reverses in direction at the same controllable rate as that of the periodic reversals of the first-mentioned transverse field; adjusting said controllable rate until a condition of resonance is effected between it and the gyromagnetic precessings of at least some of the nuclei of said certain kind in said sample; and seeking the presence of a similar condition of resonance between said rate and that of gyromagnetic precessings of nuclei contained in the increment then being magnetized.

11. An improvement as in claim 10 which comprises the further steps of subsequently individually magnetizing uni-directionally a number of the others of said increments located in said region along said reference; permeating each of said other increments, during its magnetization, with a magnetic field whose orientation is transverse to said magnetization and which periodically reverses in direction at the adjusted rate of said periodic reversals; seeking the presence of a similar condition between said rate and that of gyromagnetic precessings of nuclei contained in each of said other increments as it is magnetized and permeated; relocating the sample in another region along said reference; and re-adjusting, if necessary, the adjusted rate for said periodic reversals by again applying the steps of magnetizing, permeating and adjusting to said sample in its relocated position in said new region; and thereafter applying the steps of magnetizing, permeating and seeking to still others of said increments which are located in said last-mentioned region, the step of permeating being effected with a transverse field whose periodic reversals are at the re-adjusted rate.

12. A method as in claim 10 which comprises the further steps of subsequently individually magnetizing uni-directionally a number of the others of said increments; permeating each of said increments during its magnetization with a magnetic field whose orientation is transverse to said magnetization and which periodically reverses in direction at the adjusted rate of said periodic reversals; and seeking the presence of a similar condition between said rate and that of gyromagnetic precessings of nuclei contained in each of said other increments as it is magnetized and permeated; and in which the steps of magnetizing and permeating said sample are applied during the application of the steps of magnetizing, permeating and seeking to each of said increments, and which comprises the further additional steps of: equally uni-directionally magnetizing a second monitoring sample known to include nuclei which while of said certain kind are differently molecularly bound than those contained in the first-mentioned sample; permeating the second sample with a magnetic field which is transverse to its uni-directional magnetization and periodically reverses in direction at the adjusted rate of said periodic reversals; and under these conditions and during the magnetization of each increment determining whether a condition of resonance between said adjusted rate and the precessings of nuclei of said certain kind is present in one of the samples and absent in the other to thereby monitor the operativeness of the method to selectively adjudge, by attainment of a detectable condition of nuclear magnetic resonance thereof, the presence in an increment under magnetization of nuclei of said certain kind only if they are bound in a predetermined way.

13. A method as in claim 12 wherein in the application of the steps of magnetizing, permeating and seeking with respect to each of said increments said equal magnetization of the increment and of each of said samples is accomplished over a time interval which is controllable in length to render the method operative for selectively adjudging the presence in an increment of nuclei of said certain kind only if they are bound in a predetermined way.

14. Nuclear magnetic resonance testing apparatus for determining whether selected nuclei are present in a specimen sample undergoing examination, comprising means for separately and simultaneously magnetizing said specimen sample and at least one separate monitor sample containing said selected nuclei, with a uni-directional field, both said samples being maintained under common ambient conditions, means for separately and simultaneously permeating said samples with a magnetic field the orientation of which is transverse to that of the uni-directional field and which periodically reverses in the direction in which it is transverse thereto at a rate which is substantially equal to the rate to which the selected nuclei will gyromagnetically precess in the uni-directional field, electric means for separately detecting from each sample some effect caused by a condition of resonance between the precessings of said nuclei and the periodical reversings of said transverse field, and for producing electrical outputs separately indicative of said effects, a frequency modulator responsive to an output signal indicative of said effect upon a monitor sample, and an oscillator responsive to said modulator for modulating said second-mentioned means for permeating said samples.

15. Apparatus as in claim 14 comprising two separate monitor samples, one sample containing the selected nuclei bound in a molecule of substance different from that of the molecule in which it is bound in the other monitor sample.

16. Apparatus as in claim 14 which includes means for periodically magnetizing the samples at repeated intervals of controlled duration.

17. Nuclear magnetic resonance testing apparatus for determining whether selected nuclei are present in a specimen sample undergoing examination comprising means for separately and simultaneously magnetizing said specimen sample and at least one separate monitor sample containing said selected nuclei, with a uni-directional field, both said samples being maintained under common ambient conditions, means, including an oscillator for generating a carrier wave, for separately and simultaneously permeating said samples with a magnetic field, the orientation of which is transverse to that of the uni-directional field and which periodically reverses in the direction in which it is transverse thereto at a rate which is substantially equal to the rate at which selected nuclei will gyromagnetically precess in the uni-directional field, electric means for separately detecting from each sample some effect caused by a condition of resonance between the precessings of said nuclei and the periodical reversings of said transverse field and for producing electrical outputs separately indicative of said effects, a frequency modulator responsive to an output signal indicative of said effect upon a monitor sample, and means for operatively coupling said modulator to said oscillator.

18. Apparatus as in claim 17 in which the oscillator is automatically adjusted to operate at least momentarily at the precession frequency of said selected nuclei.

19. Nuclear magnetic resonance testing apparatus for determining whether selected nuclei are present in a specimen sample undergoing examination comprising uni-directional magnetic means for simultaneously subjecting the specimen sample and at least one separate monitor sample containing said selected nuclei to a uni-directional magnetic field under common ambient conditions, means for simultaneously subjecting said two samples to an alternating field the orientation of which is transverse to that of the uni-directional field and which periodically reverses in the transverse direction, the combination of the means for producing said uni-directional field and said transverse field being adapted and arranged to produce a predetermined relationship between the strength of the uni-directional field and the frequency of the alternating field suitable to induce a condition of magnetic resonance in said selected nuclei, electric means for separately detecting the nuclear magnetic resonance condition of the respective samples, means for producing a control signal in response to the signal detected from at least one of said monitor samples, and means for applying said control signal to at least one of said magnetic field producing means in order to maintain the predetermined relationship between the intensity of the uni-directional field and the frequency of the alternating field.

20. Apparatus as in claim 19 wherein the control signal is applied to the alternating field producing means in order to control the frequency of the alternating field.

21. Nuclear magnetic resonance testing apparatus for determining whether selected nuclei are present in a specimen sample undergoing examination comprising uni-directional magnetic means for simultaneously subjecting the specimen sample and at least one separate monitor sample containing said selected nuclei to a uni-directional magnetic field under common ambient conditions, means for simultaneously subjecting said two samples to an alternating field the orientation of which is transverse to that of the uni-directional field and which periodically reverses in the transverse direction, the combination of the means for producing said uni-directional field and said transverse field being adapted and arranged to produce a predetermined relationship between the strength of the uni-directional field and the frequency of the alternating field suitable to induce a condition of magnetic resonance in said selected nuclei, electric means for separately detecting the nuclear magnetic resonance condition of the respective samples, means for producing a control signal in response to the signal detected from at least one of said monitor samples, and means for employing said control signal to maintain the predetermined relationship between the intensity of the uni-directional field and the frequency of the alternating field.

22. Nuclear magnetic resonance testing apparatus for determining whether selected nuclei are present in a specimen sample undergoing examination comprising uni-directional magnetic means for subjecting the specimen sample and at least one separate monitor sample containing said selected nuclei to a uni-directional magnetic field under common ambient conditions, means for subjecting said two samples to an alternating field the orientation of which is transverse to that of the uni-directional field and which periodically reverses in the transverse direction, the combination of the means for producing said uni-directional field and said transverse field being adapted and arranged to produce a predetermined relationship between the strength of the uni-directional field and the frequency of the alternating field suitable to induce a condition of magnetic resonance in said selected nuclei, electric means for separately detecting the nuclear magnetic resonance condition of the respective samples, means for producing a control signal in response to the signal detected from at least one of said monitor samples, and means for employing said control signal to maintain the predetermined relationship between the intensity of the uni-directional field and the frequency of the alternating field.

References Cited in the file of this patent

UNITED STATES PATENTS

| | | |
|---|---|---|
| 2,589,494 | Hershberger | Mar. 18, 1952 |
| 2,721,970 | Levinthal | Oct. 25, 1955 |

OTHER REFERENCES

Andrew: Nuclear Magnetic Resonance, Cambridge Press 1955.

Notice of Adverse Decision in Interference

In Interference No. 91,817 involving Patent No. 2,912,641, R. J. Ruble, Analysis techniques based on nuclear magnetic resonance, final judgment adverse to the patentee was rendered Sept. 1, 1964, as to claims 2, 3, 8 and 9.

[*Official Gazette October 27, 1964.*]